United States Patent
Kadhim

(10) Patent No.: US 7,255,323 B1
(45) Date of Patent: Aug. 14, 2007

(54) PRESSURE ACTIVATED VALVE

(75) Inventor: Mahmood Kadhim, Mesa, AZ (US)

(73) Assignee: Praetorian, Inc., Mesa, AZ (US)

( * ) Notice: Subject to any disclaimer, the term of this patent is extended or adjusted under 35 U.S.C. 154(b) by 67 days.

(21) Appl. No.: 11/208,315

(22) Filed: Aug. 19, 2005

(51) Int. Cl.
*F16K 31/08* (2006.01)

(52) U.S. Cl. .......................................... 251/65; 137/529

(58) Field of Classification Search ............... 251/65; 137/517, 519, 529
See application file for complete search history.

(56) References Cited

U.S. PATENT DOCUMENTS

| | | | |
|---|---|---|---|
| 2,609,835 A | 9/1952 | Horvay | |
| 2,646,071 A | 7/1953 | Wagner | |
| 2,667,895 A * | 2/1954 | Pool et al. | 137/528 |
| 3,454,040 A | 7/1969 | Dunkeus | |
| 3,468,338 A * | 9/1969 | Patterson | 137/517 |
| 3,495,620 A * | 2/1970 | Bazell et al. | 137/529 |
| 3,528,453 A | 9/1970 | Dunkeus | |
| 4,253,489 A | 3/1981 | Schleiter | |
| 4,489,754 A | 12/1984 | Seessle | |
| 4,630,799 A * | 12/1986 | Nolan et al. | 251/129.18 |
| 4,874,012 A * | 10/1989 | Velie | 137/557 |
| 5,009,388 A | 4/1991 | Pei-gi | |
| 5,203,365 A * | 4/1993 | Velie | 137/454.2 |
| 5,280,806 A * | 1/1994 | Glazebrook | 137/517 |
| 6,000,417 A | 12/1999 | Jacobs | |
| 6,092,545 A | 7/2000 | Bedore | |
| 6,591,864 B1 | 7/2003 | Denby | |

\* cited by examiner

*Primary Examiner*—Eric Keasel
*Assistant Examiner*—John K. Fristoe, Jr.
(74) *Attorney, Agent, or Firm*—LaValle D. Ptak

(57) ABSTRACT

A pressure activated valve incorporates arrangements of permanent magnets within the valve housing to establish a pressure threshold at which the valve is either opened or closed. The magnets are mounted relative to one another with opposing polarities; so that the repelling force between the magnets establishes the pressure threshold at which the valve is operated.

2 Claims, 3 Drawing Sheets

PRESSURE ACTIVATED VALVE

BACKGROUND

Pressure activated valves are employed in various systems to operate when pressure applied to the valve exceeds some pre-established threshold. Typically, such valves employ coil springs or magnetic attraction between either two magnets or a magnet and magnetizable material to establish the threshold pressure. Once the threshold has been reached, the valve is operated by overcoming the spring force or the magnetic attraction force. It is desirable to provide an improved pressure activated valve.

DETAILED DESCRIPTION

Figure 1:
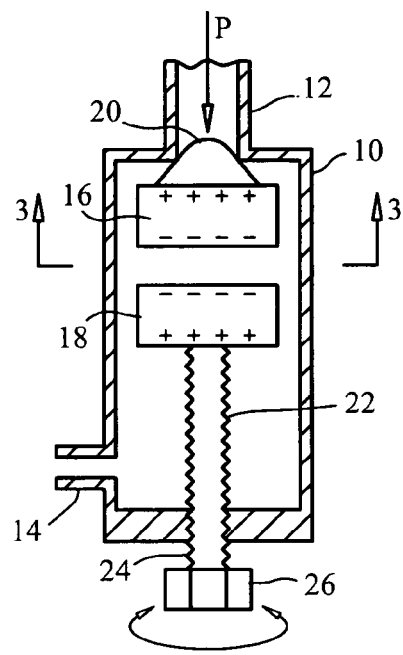
FIG. 1 is a diagrammatic cross-sectional view of an embodiment of the invention in one state of operation.

Reference now should be made to the drawings, in which the same reference numbers are used throughout the different figures to designate the same or similar components. FIG. 1 is a diagrammatic cross-sectional view of an embodiment of the invention configured as a pressure relief valve, which is operated when the pressure at an inlet exceeds a pre-established threshold amount or force.

The valve of FIG. 1 includes an outer cylindrical body 10 made of non-magnetic material and having an inlet 12 and an outlet 14 in it. As shown in FIG. 1, the inlet 12 is coaxial with the main body portion 10 of the valve, while the outlet 14 is located in the outer periphery of the housing 10. The relative locations of the inlet 12 and the outlet 14, however, are not important, since various configurations of the valve can be effected using the same operating principles which are illustrated.

In the valve of FIG. 1, the threshold pressure is established by two opposing circular permanent magnets 16 and 18. These magnets may be made of any suitable material which provides the necessary magnetic force, as well as resistance to any corrosive materials which may be used in the system with which the magnets are used. The permanent magnets may be made of ferrous material, ceramics, or various types of rare earth magnetic material. The particular type of material is selected for the application in which the valve is to be used. The operating principles are the same, irrespective of the type of magnetic material which is employed.

As shown in FIG. 1, the magnets 16 and 18 are magnetized axially, that is through their thickness, to present positive and negative poles on the opposing surface areas of the respective magnets. The magnets are mounted in the housing 10, with the facing magnetic surfaces being of the same polarities (either positive or negative magnetic polarity); so that they are in a repelling or repulsive orientation, tending to push the magnets 16 and 18 apart.

The magnet 18 is mounted on a threaded shaft 22, which is threaded through an opening in the bottom of the valve housing 10. The vertical orientation or position of the magnet 18 within the valve housing 10 is established by rotating the shaft 22 through a head 24, in either direction, to move the magnet 18 up and down vertically within the housing 10.

Figure 2:
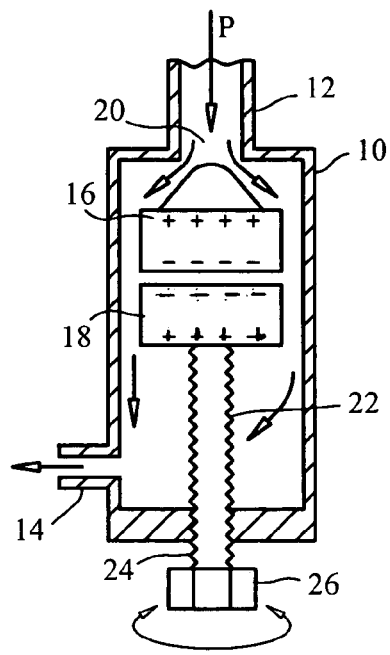
FIG. 2 is a cross-sectional diagrammatic view of the embodiment shown in FIG. 1 in a second state of operation.

The second magnet 16 carries a conical rubber or resilient valve closing member 20 on its upper surface (as shown in FIGS. 1 and 2) and is guided for reciprocal movement axially within the housing 10 by means of internally spaced longitudinal ribs 30 configured to ride within notches 32 on the periphery of the magnet 16. Alternatively, a smaller diameter magnet 16 without the notches 32, configured to ride within the circle defined by the innermost extending tips of the ribs 30, could be employed. On the other hand, the magnet 16 could employ projections spaced about its periphery to allow it to slide axially within the housing 10. Any configuration which allows the passage of fluid around the periphery of the magnet 16 (and also around the periphery of the magnet 18) may be employed.

The force with which the valve is held closed by the repulsive forces between the fixed position magnet 18 (the position of which can be adjusted as described previously) and the movable magnet 16 is established by a number of different parameters, namely the surface area of the magnets 16 and 18, the magnetic strength of the magnets 16 and 18 causing the repulsive force between them, the distance which is established by the rotation of the screw 22, and the temperature in which the valve is operated.

Figure 3:
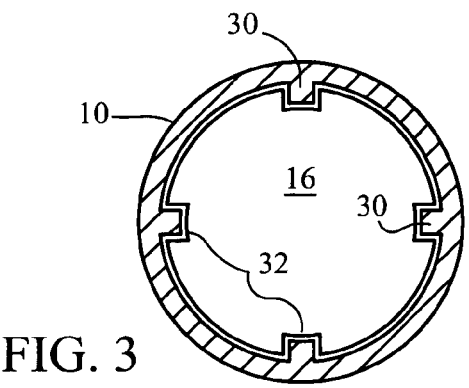
FIG. 3 is a cross-sectional view taken along the lines 3-3 of FIG. 1.

The valve illustrated in FIGS. 1,2 and 3 is operated as a pressure relief valve of the type which is used, for example, on water heaters for relieving internal pressure of the water when it exceeds a pre-established threshold. The valve of FIGS. 1,2 and 3 also may be used in various types of hydraulic systems and the like. Once the pressure P at the inlet 12 of the valve exceeds the threshold established by means of adjustment of the various parameters described above, the repulsive force between the two magnets 16 and 18 is overcome; and the movable magnet 16 is moved downwardly, as shown in FIG. 2, to allow relief of fluid in excess of the threshold pressure P to flow through the inlet 12, around the magnets 16 and 18, and out through the pressure relief outlet 14, as shown in FIG. 2.

Figure 4:
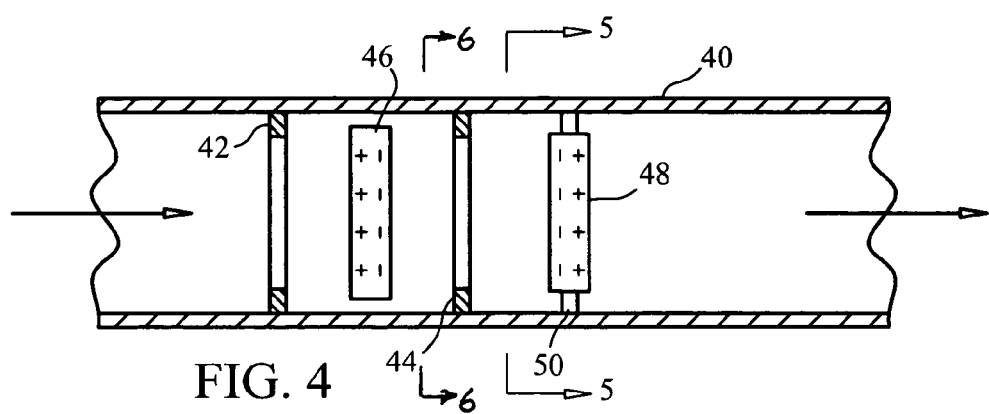
FIG. 4 is a diagrammatic cross section of another embodiment of the invention.
Figure 5:
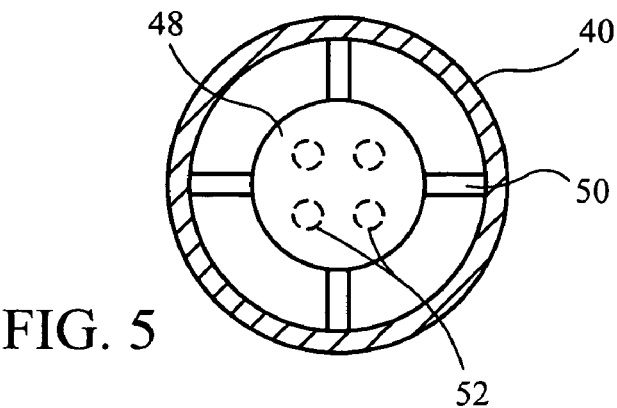
FIG. 5 is a cross section taken along the line 5-5 of FIG. 4.
Figure 6:
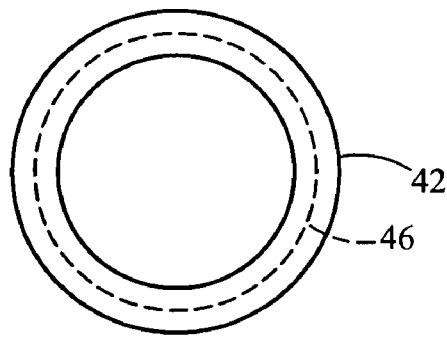
FIG. 6 is a cross section taken along the line 6-6 of FIG. 4.

FIGS. 4,5 and 6 are directed to a cylindrical valve configuration which operates to close the valve when the inlet pressure applied to the left-hand side as shown in FIG. 1 is less than a first threshold pressure P1, and to open the valve when the fluid pressure applied to the inlet side on the left hand, as shown in FIG. 1, is greater than the threshold pressure P1 and less than a second higher threshold pressure P2. The valve of FIG. 4 once again is closed when the fluid inlet pressure exceeds the second higher pressure P2. In summary, the valve of FIG. 4 is closed when the pressure is less than the first lower threshold P1, is open when the pressure is between P1 and a greater pressure P2, and the valve is again closed when the inlet fluid pressure exceeds the second greater threshold pressure P2.

In FIGS. 4,5 and 6, a fixed position permanent magnet in the form of a circular disc 48 is mounted in the right-hand side of the valve housing 40. The mounting may be effected in a number of different ways; and as illustrated in FIG. 5, four spaced supporting arms 50 mount the magnet 48 centrally and coaxially in the housing 40. This allows fluid flow to take place around the periphery of the magnet 48 between the supporting arms 50. Alternatively, the magnet 48 could be provided with a number of apertures or holes 58 through it to allow the passage of fluid through the magnet; and the outer periphery of the magnet 48 could be secured in any suitable manner to the internal diameter of the housing 40.

Two spaced valve seats 42 and 44 are located toward the left of the magnet 48 as viewed in FIG. 4. These valve seats generally are in the form of a washer-like configuration, with the external diameter attached to or affixed to the interior of the housing 40 in any suitable manner. The facing surfaces of the valve seat 42 and 44 preferably are formed of a resilient material of any suitable type to withstand the pressure and type of fluid which is flowing through the housing 40.

A movable permanent magnet 46 is arranged for reciprocal movement between the facing surfaces of the valve seats 42 and 44, as determined by the repulsive magnetic forces between the two magnets 46 and 48 and the pressure of the fluid entering the housing 40 from the left-hand side, as viewed in FIG. 4. The manner in which the permanent magnet 46 is mounted for the reciprocal movement may be as described above in conjunction with FIG. 3. The outer periphery of the magnet 46 is arranged to allow for fluid flow around that outer periphery and through the housing 40 whenever the magnet 46 is in an intermediate position between the valve seats 42 and 44, as shown in FIG. 4.

When the valve of FIG. 4 is in its rest or relaxed condition without any fluid being applied to the left-hand side, the repulsive force between the two magnets 46 and 48 is such that the magnet 46 is pushed by a force P1 against the right-hand side of the valve seat 42 to close the valve. When fluid pressure in excess of an initial lower pressure P1 is applied to the inlet on the left-hand side of the valve of FIG. 4, the repulsive force P1 is overcome and the magnet 46 is moved from the position just described to the intermediate position shown in FIG. 4. As long as the fluid inlet pressure of the fluid applied to the left-hand side of the valve is between this lower threshold P1 and a higher threshold P2, fluid flows through the valve from the left-hand end to the right-hand end, around the peripheries of the magnets 46 and 48, and through the centers of the valve seats 42 and 44.

When, however, the fluid pressure applied through the inlet side of the valve exceeds a second threshold pressure P2, the movable magnet 46 moves toward the right to engage the facing surface of the valve seat 44 and once again close the valve. A reversal of these pressures results in a reversal of the operation described above; so that this valve only allows a fluid flow at a pressure between the pressures P1 and P2 to take place through it.

Figure 8:
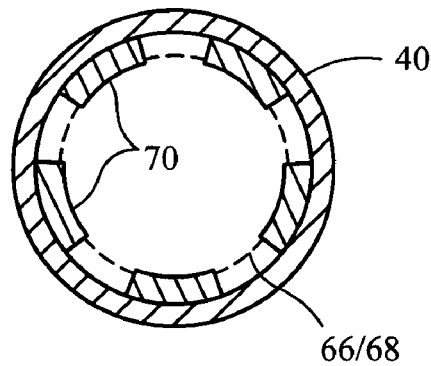
FIG. 8 is a cross section taken along the line 8-8 of FIG. 7.
Figure 7:
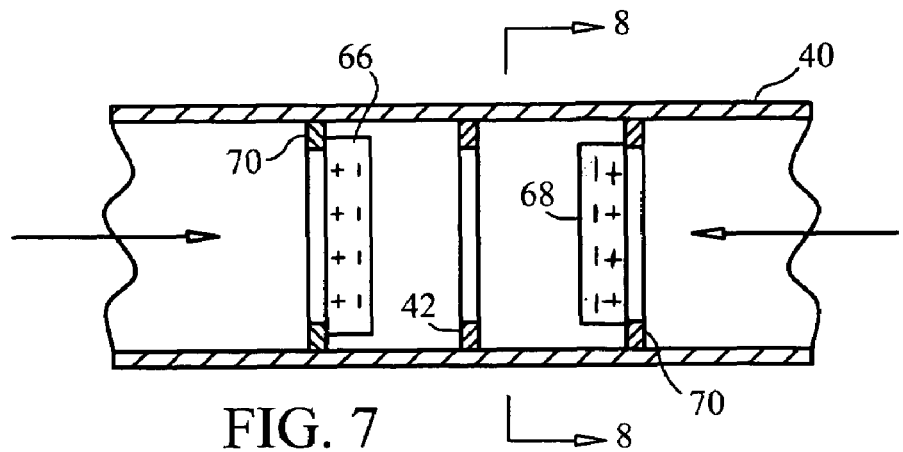
FIG. 7 is a diagrammatic cross section of another embodiment of the invention.

The valve which is illustrated in FIGS. 7 and 8 is designed as a bi-directional valve which normally allows fluid flow through it in either direction, and which is closed in response to a pressure in excess of a pre-established threshold in either direction. In the valve of FIG. 7, a valve seat in the form of a washer-shaped member 42 is located in the center of the housing 40. The valve seat 42 is coated with or is made of a resilient material on each of its surfaces; so that whenever a permanent magnet 66 or 68 engages one side or the other of the valve seat 42, the valve is closed.

As shown in FIG. 8, the circular permanent magnets 66 and 68 are provided with a diameter which is less than the interior diameter of the housing 40, and the magnets are held in their relaxed or unoperated positions against spaced teeth 70 located about the periphery on the interior of the housing 40, as shown most clearly in FIG. 8. This allows fluid to flow around the edges of the magnets 66 and 68, and through the holes in the center of the valve seat 42 in either direction through the valve. The repulsive forces of the magnets 66 and 68 cause them to attain the position shown in FIG. 7.

Whenever a pressure in excess of an established threshold, for example P1, is encountered by the fluid flowing from left to right through the left-hand end of the valve, the threshold repulsive force or pressure established by the magnetic force between the magnets 66 and 68 is overcome; and the magnet 66 is moved toward the right to seat on the valve seat 42, blocking further fluid flow from left to right through the valve. Similarly, whenever pressure in excess of P1 established by the magnets 66 and 68 is applied from the right-hand side of the valve to flow from right to left through the valve, the magnet 68 moves toward the left to engage the opposite side of the valve seat 42, and close the valve. Thus, the valve of FIGS. 7 and 8 allows fluid flow in a bi-directional direction so long as that fluid flow is less than a predetermined threshold pressure in either direction.

Figure 9:
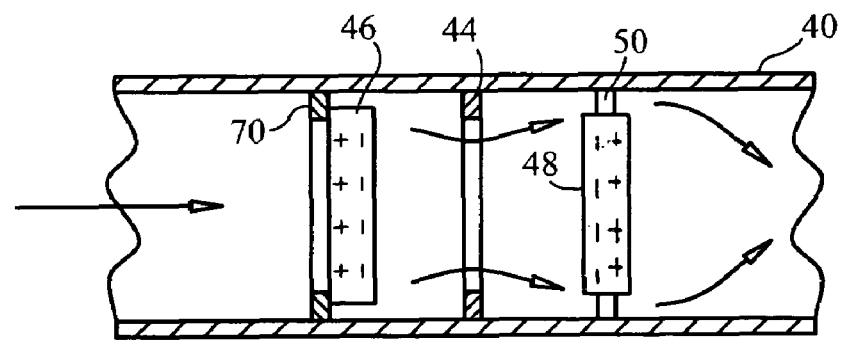
FIG. 9 is a diagrammatic cross section of another embodiment of the invention.
Figure 10:
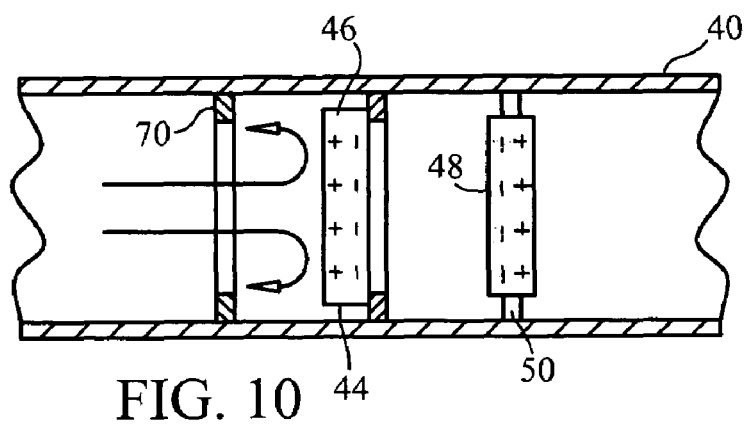
FIG. 10 is a diagrammatic cross section of the embodiment shown in FIG. 9 in a different mode of operation from that shown in FIG. 9.

FIGS. 9 and 10 are directed to a magnetic repulsive valve which is closed when pressure in excess of a predetermined amount (established by the repulsive forces between the fixed magnet 48 and the movable magnet 46) is exceeded. The configurations of the magnets are similar to the ones described above in conjunction with the fixed magnet 48 of FIG. 4 and the movable magnets 66 and 68 of FIGS. 7 and 8, for example. Once a threshold pressure P1 is exceeded by fluid applied to the left-hand side of the system shown in FIGS. 9 and 10, the movable magnet 46 is pushed toward the right, as shown in FIG. 10, to close the valve seat 44 in a manner similar to that described above in conjunction with the operation of FIGS. 4 and 7. No further fluid flow from left to right through the valve member 40 then can take place as long as the pressure of the fluid on the left-hand side of the valve exceeds the pre-established threshold pressure.

The various types of valve configurations which have been described above may be incorporated into a variety of different operating systems for handling fluids in the form of both gases and liquids. Systems employing the repulsive magnetic forces of the valves described above in conjunction with the different embodiments operate effectively as check valves, pressure relief valves and pressure regulators, and can be substituted for cumbersome valve arrangements for performing these functions which have been used in the past.

The foregoing description of various embodiments of the invention is to be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A pressure activated valve for allowing fluid flow therethrough when pressure of the fluid at the inlet thereof exceeds a predetermined amount and for preventing flow of fluid therethrough whenever the pressure exceeds a second greater predetermined amount, the valve including in combination: a valve housing having a fluid inlet and a fluid outlet; first and second spaced apart valve seats in the valve housing oriented to permit fluid flow therethrough from the fluid inlet of the valve housing to the fluid outlet thereof; a first permanent magnet mounted in a fixed position between the outlet of the valve housing and the second valve seat and allowing fluid flow thereby; a second permanent magnet mounted for reciprocal movement between the first and second valve seats, with the polarities of the first and second magnets oriented to cause a repelling force to exist between the magnets, such that in the absence of any fluid pressure at the inlet of the valve housing, the second permanent magnet is moved by the first permanent magnet to close the first valve seat with a first predetermined pressure.

2. A pressure activated valve according to claim 1 wherein the repelling force between the first and second magnets is selected such that fluid pressure in excess of the first predetermined pressure causes the second magnet to be located in a position intermediate the first and second valve seats and fluid pressure in excess of a second predetermined pressure causes the second permanent magnet to move to close the second valve seat preventing fluid flow through the valve housing.

\* \* \* \* \*